United States Statutory Invention Registration [19]

[11] Reg. Number: H697

Thomas, Sr. [43] Published: Nov. 7, 1989

[54] SUBMUNITION FUSE WITH REMOVABLE BLOCKER

[75] Inventor: Terry E. Thomas, Sr., Forest Hill, Md.

[73] Assignee: The United States of America as represented by the Secretary of the Army, Washington, D.C.

[21] Appl. No.: 379,023

[22] Filed: Jul. 10, 1989

[51] Int. Cl.[4] ..... F42C 15/22; F41B 13/50

[52] U.S. Cl. ..... 102/239; 102/237; 102/393; 102/489

*Primary Examiner*—David H. Brown

*Attorney, Agent, or Firm*—Anthony T. Lane; Edward Goldberg; Edward F. Costigan

[57] ABSTRACT

A plurality of submunitions packed in a projectile deliver an incapacitating gas payload at far range from the projectile launch site only after the submunitions have been properly armed by mechanical removal of a blocker member from between an in-line firing pin and primer. A non-ground-impact type fuse detonates each submunition.

11 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SUBMUNITION FUSE WITH REMOVABLE BLOCKER

GOVERNMENTAL INTEREST

The invention described herein may be manufactured, used and licensed by or for the Government for Governmental purposes without payment to me of any royalties.

BACKGROUND OF THE INVENTION

1. Field of the Invention

This invention generally relates to a fuze for a submunition loaded with a solid pyrotechnic chemical main charge which, when burned, produces an incapacitating gas and, more particularly, to the reliable delivery of the gas to, and the saturation of, a restricted area at far range from the launch point of a projectile in which the submunition is contained.

2. Description of Related Art

In many applications, e.g. tear gas for riot control or chemical warfare, it is desirable to deny access of a certain area to unauthorized persons or enemy forces. For this purpose, an incapacitating gas is used to saturate the restricted area. It has been proposed to load a solid pyrotechnic chemical main charge in each of a plurality of submunitions, all of which are loaded in a launch projectile, for example, a 155 mm projectile fired from a gun or howitzer. The projectile is typically launched at a far range from the restricted area, primarily to protect launch personnel from the incapacitating effects of the gas which might occur if there is a firing malfunction or if prevailing winds blow the gas back to the launch site.

It has been proposed to use ground-impact-type fuzes to detonate explosive primers which, in turn, burn the chemical main charge, thereby initiating a chemical reaction that produces the incapacitating gas. However, such ground-impact type fuzes do not disperse the incapacitating gas as well as an above-ground release. Also, the existing ground-impact-type fuzes are expensive to produce and somewhat bulky. Ground impact fuzes will misfire if they land on a soft target area, thereby subjecting friendly forces to armed, dud-fired, chemical munitions when the target area is re-taken.

SUMMARY OF THE INVENTION

1. Objects of the Invention

It is a general object of this invention to advance the state of the art of submunition fuzes, particularly submunition fuzes used for delivering an incapacitating gas to a restricted area.

It is another object of this invention to produce a reliable incapacitating gas delivery system which is safe to launch personnel.

A further object of this invention is to provide a fuze operative for initiating the chemical reaction that produces the incapacitating gas while the submunition is still in the air, for better dispersion of the gas and for providing a high degree of reliability on both soft and hard targets.

Another object of this invention is to provide a fail-safe fuze for reliably igniting and burning a solid chemical charge at far range well away from the launch site.

Still another object of this invention is to provide a submunition fuze which is inexpensive to produce.

2. Features of the Invention

In keeping with these objects, and others which will become apparent hereinafter, one feature of this invention resides, briefly stated, in a fuze for a submunition of the type subjected to spinning and air turbulence after launch of a projectile containing the submunition. In a preferred embodiment, a multitude of such submunitions are stacked and loaded into a projectile containing the submunitions.

This invention comprises a submunition housing, preferably of wedge-shaped design, having a compartment containing a solid pyrotechnic chemical main charge. When burned, the main charge produces a gas capable of incapacitating humans and animals. A percussion-type firing pin is mounted on the housing for movement in a longitudinal direction along a travel path from a latched to a released position. Biasing means, e.g. a coil spring, is operative for constantly urging the firing pin along the travel path from the latched to the released position. Latch means, e.g. a restraining handle, is operative for engaging and maintaining the firing pin in the latched position.

The invention still further comprises a casing stationarily mounted on the housing and having a chamber containing a percussion primer. The chamber has an access port aligned with, and in the travel path of, the firing pin. The primer is accessible through the access port for impact with the firing pin. The chamber also has an exit port in open communication with the compartment containing the main charge.

A displaceable blocking means, e.g. a blocking bar or plate, is mounted on the housing for displacement in a transverse direction generally perpendicular to the longitudinal direction between blocked and unblocked positions in which the blocking means is respectively positioned in and remote from the travel path of the firing pin.

Displacing means, including a central core rod engaged with the blocking means, is operative for displacing the blocking means from the blocked to the unblocked position when centrifugal forces generated during said spinning and said air turbulence cooperate to pull the blocking means to the unblocked position.

After projectile launch, and after each submunition is expelled from the projectile, the air turbulence surrounding each submunition and the spin imparted to each submunition during launch cooperate not only to pull the blocking means to the unblocked position, as described above, but also to remove the aforementioned restraining handle, thereby releasing the firing pin from its latched position. The biasing means is now enabled to urge the released firing pin past the removed blocking means and through the access port and into striking contact with the primer. This striking contact detonates the primer and directs a flame through the exit port to burn the main charge in the compartment. The resulting incapacitating gas is discharged through a discharge port provided on the housing. The gas saturates an area, access to which is to be denied, at a far range from the projectile launch site.

The above-described fuze is normally unarmed, since the firing pin is normally restrained in the latched position, and the in-line primer is normally blocked by the blocking means from the travel path of the firing pin. In order for the blocking means to be removed out of the travel path of the firing pin, the projectile must, first of all, be launched and, secondly, the submunitions and the central core rod must be expelled from the projectile and dispersed. The submunitions are imparted with a spin of at least 700 rpm which is sufficient, together with the air turbulence, to pull the submunitions and the core rod apart. Air turbulence and spin are therefore affirmatively used to release the firing pin and to remove the blocking means from the submunitions. All of these factors mitigate against the discharge of the incapacitating gas in the proximity of the launch site, thereby maximizing safety for launch personnel.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
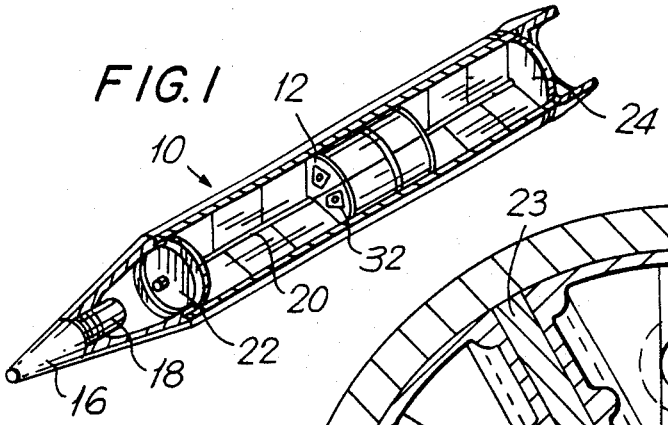
FIG. 1 is a cut-away perspective view of a projectile containing a plurality of submunitions, each detonated by a fuze according to the present invention.
Figure 2:
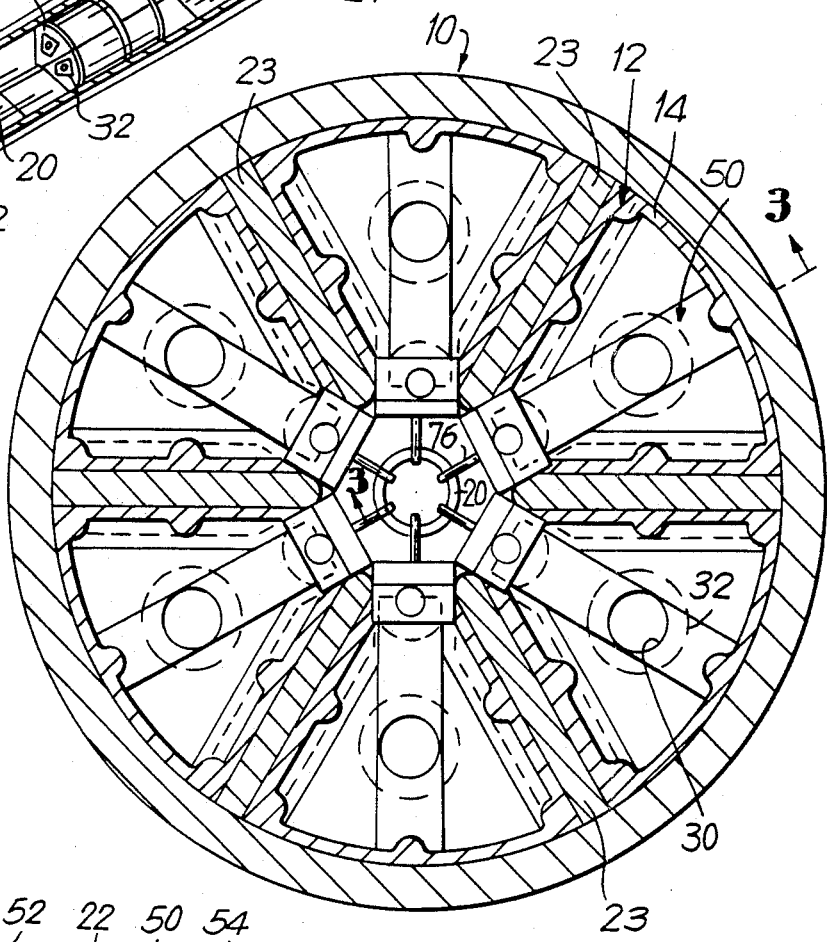
FIG. 2 is a cut-away sectional view of six such submunitions mounted on a core rod within the projectile.
Figure 3:
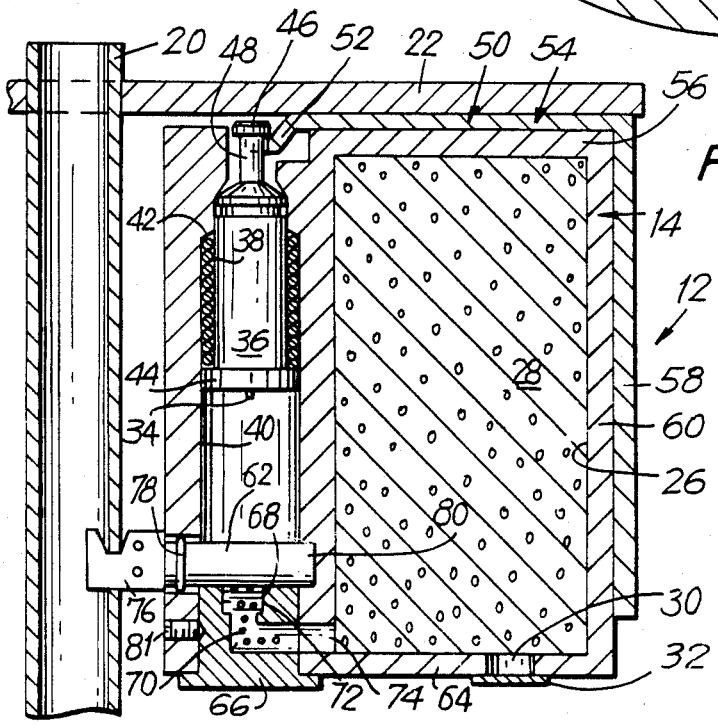
FIG. 3 is a sectional view taken on line 3—3 of FIG. 2.

Referring now to FIG. 1, reference numeral 10 generally identifies a streamlined launch projectile. In the preferred embodiment, the projectile 10 is dimensioned so as to be launched from a 155 mm gun or howitzer. A plurality of submunitions, a representative one of which is identified by reference numeral 12 in FIGS. 2 and 3, are loaded into the projectile. Each submunition 2 has a wedge-shaped housing 14 which subtends an angle of about 60° in top plan view. As best seen in FIG. 2, six of these wedge-shaped submunitions are arranged in an annulus or ring-shaped tier resembling a circular pie cut into six equal sectors. Eight of these tiers are stacked, one immediately behind another, lengthwise of the projectile. Hence, the loaded projectile, in the preferred embodiment, has forty-eight identical submunitions 12 stacked in mutual close contact.

Returning to FIG. 1, an expelling fuze 16 is located at the nose of the projectile. An expelling charge 18 is located rearwardly of the expelling fuze 16. A relatively heavy, flight-stabilizing, hollow, center core rod 20 extends through the center of the stacked tiers of submunitions. A front pusher plate 22 is mounted at a front end of the rod 20 above the stacked submunitions. A rear end plate 24 is mounted at a rear end of the rod 20 below the stacked submunitions. Support plates 23 are each located between adjacent submunitions and extend radially outwardly from the rod 20 to support the submunitions. The plates 22,23,24 with the stacked submunitions therebetween form a closely packed assembly which, together with the core rod, is inserted as a unit into the main body of the projectile. The end plate has shear pins which engage the outer casing of the projectile in order to maintain the interior components in place. As explained below, each submunition 12 is detachably coupled to the core rod 20.

In a conventional manner, a load of gunpowder or the like is loaded into a gun barrel formed with interior rifling, after the projectile 10 was loaded into the barrel. The projectile is launched by the explosion of the gunpowder. The rifling imparts a spin to the projectile. At a predetermined time after launch, the expelling fuze 16 ignites the expelling charge 18, and the resulting detonation gases force the pusher plate 22 and, in turn, all of the submunitions 12, the core rod 20 and the end plate 24 out through the back end of the projectile. The force of the explosion shears the aforementioned shear pins. The spin imparted to the projectile 10 combined with the air turbulence causes the expelled submunitions and the expelled core rod to also spin. The submunitions are spun away and are uncoupled from the core rod. Once uncoupled, the submunitions are dispersed outwardly away from the core rod. As explained below, this spin and air turbulence will be affirmatively used to actuate each submunition, which is in direct contrast to the prior art submunitions which are actuated upon impact with the ground.

Turning now to FIG. 3, each submunition housing 14 has a compartment 26 which contains a solid pyrotechnic chemical main charge 28. When burned, the main charge produces an incapacitating gas. A discharge port 30 is provided on the housing and communicates with the compartment 26. The discharge port 30 is normally covered by a rupturable foil, preferably a tin foil 32, to maintain the main charge within the compartment 26. During burning of the main charge, the foil 32 ruptures and permits discharge of the gas.

A percussion-type firing pin 34 is mounted on the housing 14 for sliding movement in a longitudinal direction along a travel path from a latched to a released position. The pin 34 is of one piece with a cylindrical shaft 36 around the exterior of which a coil spring 38 is located. The spring 38 is lodged in a longitudinal channel 40, and has one coil end in abutment with an end wall 42 of the channel 40. The opposite end of the spring 38 bears against an enlarged flange 44 located between the pin 34 and the shaft 36. The spring 38 is under tension in the latched position, and is operative for constantly urging the pin 34 along the travel path from the latched to the released position.

At the end of the shaft 36 away from the pin 34, an enlarged head 46 is connected to the rear of the shaft 36 by a cylindrical post 48. A restraining handle 50 is operative for engaging and maintaining the pin 34 in the latched position, as illustrated in FIGS. 2 and 3. The handle 50 includes a bifurcated hook 52 which engages underneath the head 46 and straddles the post 48 in the latched position. The handle 50 includes a first top section 54 mounted on, and extending over, a top wall 56 of the housing 14, and a bent second rear handle section 58 extending at least partly along a rear wall 60 of the housing 14. The restraining handle 50 is maintained in its illustrated position, prior to being loaded into the projectile, by means of a non-illustrated handle restraint or clip. The clip resiliently clamps onto and presses the handle section 58 against the rear wall 60 of the housing and affirmatively prevents movement of the firing pin 34 prior to loading the submunition into the projectile.

During projectile loading, the clip is removed, and the restraining action on the handle 50 is performed by the other internal components within the projectile. For example, the pusher plate 22 is pressed tightly against each handle top section of the uppermost tier of submunitions, thereby fixing the position of each handle 50. For the second tier, a bottom wall 64 of each housing of the first tier is pressed into contact with a respective handle top section 54 of the submunitions of the second tier, thereby fixing the positions of the handles of the second tier. In turn, the handles of each successive tier are fixed in position by the bottom walls of the submunitions of the adjacent tier of submunitions. The end plate 24 insures that successive tiers are kept tightly packed. It will be understood that once the submunitions separate from one another, there will no longer be any restraint on the handles and, therefore, the firing pins will be released.

A casing 66 is stationarily mounted on the housing 14 by means of a set screw 81 threaded through the housing wall 14. The casing 66 has a chamber 68 in which a percussion primer 70 is press-fitted. The chamber has an access port 72 through which the primer 70 is accessible for impact with the firing pin 34. The primer and the pin are in alignment. The chamber also has an exit port 74 in open communication with the compartment 26 containing the main charge 28.

A displaceable blocker 62, e.g. a blocking bar or plate, is mounted on the housing for sliding displacement in a transverse direction generally perpendicular to the longitudinal direction between a blocked position in which the blocker extends across, and denies access of the pin 34 to, the primer 70, and an unblocked position in which the blocker is remote from, and permits access of the pin 34 to, the primer 70.

A coupling hook 76 at one end of the blocker 62 is located exteriorly of the housing 14 and is fitted into a radial slit formed in the core rod 20. One slit is formed for each submunition. As shown in FIG. 2, six equiangular slits are arranged about the rod 20, and this slitted arrangement is repeated for each tier. An O-ring 78 is tightly frictionally fit in a transverse passage 80 in which the blocker 62 is displaced. The O-ring 78 not only seals the interior of the housing from the exterior environment in the unarmed position, but also affirmatively secures the blocker in its blocking position and prevents the blocker from being accidentally removed.

As previously mentioned, once the submunitions are expelled from the projectile by the force of the detonated expelling charge 18, the submunitions continue to spin and generate centrifugal force. The maximum spin rate of the projectile 10 is on the order of 15,000–20,000 rpm.

A projectile spin rate of less than 700 rpm will be insufficient to remove the blocking bar 62 from the housing 14 after the submunitions 12 are ejected from the projectile. Insufficient centrifugal force is obtained at a spin rate less than 700 rpm to separate the blocking bar 62 from the housing 14, thereby preventing the firing pin 34 from striking the primer 70.

The fired projectile 10 exceeds the 700 rpm of spin and ejects the submunitions 12. At 700 rpm, sufficient centrifugal force is generated to move the submunitions 12 away from the center core rod 20, ripping the blocker bar 62 from the housing 14, and exposing the primer 70 to the firing pin 34. Outward movement of the submunitions 12 and air turbulence cause the submunitions 12 to separate, thus releasing the handle 50 and, in turn, releasing the firing pin 34 to strike the now-unobstructed primer 70. The spring 38 now urges the released pin with great force past the removed blocker and through the access port 72, and into striking contact with the primer 70. This striking contact detonates the primer and directs a flame through the exit port 74 to burn the main charge 28 in the compartment 26. The tin foil 32 is ruptured, thereby permitting the resulting incapacitating gas, which is formed as a result of a chemical interaction, to discharge through the discharge port 30.

The area to which the projectile has been aimed is thus saturated with the gas at a far range from the projectile launch site. Thus, the main charge of each submunition is reliably delivered to the designated area and is only detonated at that designated area. Each submunition can only deliver its payload after ejection from the projectile, and only after sufficient spin forces and air turbulence effectively disperse them apart from one another and the core rod.

The foregoing disclosure and drawings are merely illustrative of the principles of this invention and are not to be interpreted in a limiting sense. I wish it to be understood that I do not desire to be limited to the exact details of construction shown and described because obvious modifications will occur to a person skilled in the art.

It will be understood that each of the elements described above, or two or more together, also may find a useful application in other types of constructions differing from the types described above.

While the invention has been illustrated and described as embodied in a submunition fuze with removable blocker, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A fuze for a submunition subjected to spinning and air turbulence after ejection from a launched projectile containing the submunition, comprising:

(a) a submunition housing having a compartment containing a solid pyrotechnic chemical main charge which, when burned, produces an incapacitating gas;

(b) a percussion-type firing pin mounted on the housing for movement in a longitudinal direction along a travel path from a latched to a released position;

(c) biasing means for constantly urging the firing pin along the travel path from the latched to the released position;

(d) latch means for engaging and maintaining the firing pin in the latched position;

(e) a casing stationarily mounted on the housing and having a chamber containing a percussion primer, said chamber having an access port aligned with, and in the travel path of, the firing pin, and an exit port in open communication with the compartment containing the main charge;

(f) a displaceable blocking means mounted on the housing for displacement in a transverse direction generally perpendicular to the longitudinal direction between blocked and unblocked positions in which the blocking means is respectively in and remote from the travel path of the firing pin;

(g) displacing means for displacing the blocking means from the blocked to the unblocked position when centrifugal forces generated during said spinning and said air turbulence cooperate to pull the blocking means to the unblocked position;

(h) said latch means being further operative for releasing the firing pin when subjected to said spinning and air turbulence to enable the biasing means to urge the released pin past the blocking means in the unblocked position through the access port and into striking contact with the primer, thereby detonating the primer and directing a flame through the exit port to burn the main charge in the compartment; and (i) a discharge port on the housing and through which the incapacitating gas is discharged, for saturating an area with the incapacitating gas at far range from the projectile launch site.

2. The fuze as recited in claim 1, wherein the firing pin has a trailing head, and wherein the latch means is an elongated restraining handle having a bifurcated hook engaging the head in the latched position, said handle being mounted on and stationarily held against the housing to prevent the hook from becoming disengaged from the head.

3. The fuze as recited in claim 1, wherein the displacing means includes a core rod centrally mounted in the projectile, and wherein the blocking means includes a coupler which is coupled to the core rod.

4. The fuze as recited in claim 1, wherein the coupler has a hook, and wherein the core rod has a slit in which the hook is hookingly received in the blocked position.

5. The fuze as recited in claim 1, wherein the displacing means displaces the blocking means to the unblocked position when the submunition has been subjected to a spin of about 700 rpm.

6. The fuze as recited in claim 1; and further comprising a rupturable foil covering the discharge port prior to discharge of the incapacitating gas.

7. The fuze as recited in claim 1, wherein the submunition is a 60° wedge.

8. The fuze as recited in claim 1, wherein the housing is wedge-shaped, and wherein a plurality of identical wedge-shaped housings are arranged in an annulus to form a tier within the projectile, and wherein a plurality of identical tiers are stacked within the projectile.

9. The fuze as recited in claim 8, wherein six housings are arranged in each tier, and wherein eight tiers are stacked within the projectile.

10. The fuze as recited in claim 1, wherein the firing pin is slidably mounted in a longitudinal channel, and wherein the blocking means is slidably displaced along a transverse channel, said blocking means extending transversely across the longitudinal channel in the path of movement of the pin in the blocked position.

11. The fuze as recited in claim 10, wherein the blocking means includes a generally cylindrical bar, and an O-ring sealingly engaging the bar and the transverse channel.

* * * * *